(12) United States Patent
Wu et al.

(10) Patent No.: US 10,962,726 B2
(45) Date of Patent: Mar. 30, 2021

(54) STRUCTURE FOR FIBER ATTACHMENT WITH ADHESIVE MATERIAL

(71) Applicant: Lumentum Operations LLC, Milpitas, CA (US)

(72) Inventors: Frank Wu, Milpitas, CA (US); Prasad Yalamanchili, Santa Clara, CA (US); Raman Srinivasan, Milpitas, CA (US); Huijie Xu, Milpitas, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/700,121

(22) Filed: Dec. 2, 2019

(65) Prior Publication Data

US 2021/0063657 A1 Mar. 4, 2021

Related U.S. Application Data

(60) Provisional application No. 62/895,412, filed on Sep. 3, 2019.

(51) Int. Cl.
*G02B 6/42* (2006.01)
*C09J 5/00* (2006.01)
*C09J 163/00* (2006.01)

(52) U.S. Cl.
CPC .............. *G02B 6/4239* (2013.01); *C09J 5/00* (2013.01); *C09J 163/00* (2013.01); *G02B 6/4202* (2013.01); *C09J 2463/00* (2013.01)

(58) Field of Classification Search
CPC .............................. G02B 6/424; G02B 6/4239
See application file for complete search history.

(56) References Cited

U.S. PATENT DOCUMENTS

| 4,984,866 | A | * | 1/1991 | Boisgontier | G02B 6/4248 385/49 |
| 5,123,068 | A | * | 6/1992 | Hakoun | G02B 6/30 385/14 |
| 5,185,835 | A | * | 2/1993 | Vial | G02B 6/30 385/49 |
| 5,528,713 | A | * | 6/1996 | Dannoux | G02B 6/30 385/49 |
| 6,296,401 | B1 | * | 10/2001 | Paris | G02B 6/30 385/49 |
| 6,519,407 | B1 | * | 2/2003 | Kawase | G02B 6/2804 385/147 |

(Continued)

*Primary Examiner* — Sung H Pak
(74) *Attorney, Agent, or Firm* — Harrity & Harrity, LLP (57) ABSTRACT

A fiber attachment structure may comprise a monolithic platform structure having a first trench and a second trench to segment the monolithic platform structure into a chip mount area, a first island, and a second island. A laser chip may be mounted directly on the chip mount area and an optical fiber may be mounted on the first island by a first adhesive joint and on the second island by a second adhesive joint. For example, in some implementations, the first adhesive joint may include a first quantity of adhesive material attaching the optical fiber to the first island at a position at which a tip of the optical fiber is aligned with an output facet of the laser chip, and the second adhesive joint may include a second quantity of the adhesive material to mechanically secure the optical fiber to the second island.

20 Claims, 5 Drawing Sheets

(56) References Cited

U.S. PATENT DOCUMENTS

| | | | | |
|---|---|---|---|---|
| 6,866,426 B1* | 3/2005 | Steinberg | ............... | G02B 6/30 |
| | | | | 385/65 |
| 8,899,847 B2* | 12/2014 | Lin | ............... | G02B 6/4214 |
| | | | | 385/89 |
| 10,295,749 B1* | 5/2019 | Janta-Polczynski | ..... | G02B 6/30 |
| 2020/0096324 A1* | 3/2020 | Chang | ............... | G02B 6/3652 |

* cited by examiner

STRUCTURE FOR FIBER ATTACHMENT WITH ADHESIVE MATERIAL

RELATED APPLICATION

This application claims the benefit of U.S. Provisional Patent Application No. 62/895,412, entitled "STRUCTURE FOR FIBER ATTACHMENT WITH ADHESIVE MATERIAL," filed on Sep. 3, 2019, the content of which is incorporated by reference herein in its entirety.

TECHNICAL FIELD

The present disclosure generally relates to an optical assembly structure, and more particularly, to a compact structure in which a semiconductor laser diode and an optical fiber are top-mounted on a single monolithic platform with the optical fiber attached to the single monolithic platform by separate adhesive joints that mechanically secure the optical fiber and maintain an optical coupling between the semiconductor laser diode and the optical fiber.

BACKGROUND

Laser diodes are semiconductor devices that may be pumped with electrical current to create lasing conditions that may be used to convert electrical energy into light. In many applications, coupling an output from a laser diode into an optical fiber may be useful to safely transport the light, enable amplification, improve beam quality by converting an elliptical beam shape into light that has a circular and smooth intensity profile, and/or the like. Coupling the optical output from a laser diode into an optical fiber typically involves aligning the laser diode and a proximal end of the optical fiber (e.g., using micro-positioning stages) while monitoring a power output at a distal end of the optical fiber to obtain a maximum power transfer (or coupling efficiency) between the laser diode and the optical fiber. After the laser diode and the optical fiber are suitably aligned or otherwise positioned to maximize an output power from the optical fiber, the proximal end is typically secured using glass solder, a permanent laser-welded fiber attachment, and/or the like.

SUMMARY

According to some implementations, an apparatus may include: a monolithic platform structure comprising a first trench and a second trench segmenting the monolithic platform structure into a chip mount area, a first island, and a second island; a laser chip mounted directly on the chip mount area; and an optical fiber mounted on the first island by a first adhesive joint and on the second island by a second adhesive joint, wherein the first adhesive joint includes a first quantity of adhesive material attaching the optical fiber to the first island at a position at which a tip of the optical fiber is aligned with an output facet of the laser chip, and wherein the second adhesive joint includes a second quantity of the adhesive material to mechanically secure the optical fiber to the second island.

According to some implementations, a method may include: mounting a laser chip directly on a chip mount area of a monolithic platform structure comprising a first trench to segment the chip mount area from a first island and a second trench to segment the first island from a second island; applying a first quantity of adhesive material to form a first adhesive joint attaching an optical fiber to the first island thereby aligning a tip of the optical fiber with an output facet of the laser chip; and applying a second quantity of adhesive material to form a second adhesive joint to mechanically secure the optical fiber to the second island.

According to some implementations, an apparatus may include: a monolithic platform structure comprising one or more trenches segmenting the monolithic platform structure into a chip mount area and one or more islands; multiple laser chips mounted directly on the chip mount area; and multiple optical fibers mounted on the one or more islands by one or more adhesive joints that attach the multiple optical fibers to the one or more islands at respective positions at which tips of the multiple optical fibers are aligned with output facets of the multiple laser chips.

DETAILED DESCRIPTION

The following detailed description of example implementations refers to the accompanying drawings. The same reference numbers in different drawings may identify the same or similar elements.

As described above, light output from a laser diode may be coupled into an optical fiber in order to safely transport the light, improve beam quality, enable amplification, and/or the like. For example, to couple the light output from a laser diode into an optical fiber, the laser diode is typically aligned with a proximal end of the optical fiber while a power output at a distal end of the optical fiber is monitored in order to maximize power transfer (or coupling efficiency) between the laser diode and the optical fiber. After the laser diode and the optical fiber are suitably aligned or otherwise positioned to maximize an output power from the optical fiber, the proximal end of the optical fiber is typically secured to permanently fix a position of the optical fiber relative to the laser diode. In general, aligning and securing an optical fiber is a delicate process that demands submicron accuracy, fine resolution, and high stability when coupling laser light into a core of an optical fiber. For example, due to the extremely small size of optical fiber (e.g., less than ten microns for a single-mode fiber core), even a small misalignment between the optical fiber and the laser diode may result in significant signal loss.

Accordingly, laser diodes are often assembled in fiber-coupled form, with robust fiber coupling optics (e.g., a permanent fiber attachment) built into the laser package. For example, a conventional laser pump module may generally include a semiconductor laser diode (or laser chip), a partially stripped optical fiber to be coupled to an output from the laser chip, and a platform that may include one or more mounts, submounts, and/or the like to mount the laser chip, mount the optical fiber, and ensure a suitable fiber-to-laser coupling. For example, in many cases, the platform typically includes an independent chip mount to which the laser chip is attached and an independent fiber mount to which the optical fiber is attached, and the chip mount and the fiber mount are then attached to an additional substrate with larger dimensions.

In some cases, the optical fiber may be attached to the fiber mount by a single solder joint made from glass solder or another high-temperature solder on top of the fiber mount, which may allow the solder to be reflowed multiple times in order to achieve a desired peak coupling power. However, using solder to mount the optical fiber on top of the fiber mount typically involves rework to obtain sufficient optical alignment, which can take a long time, increase costs, weaken fiber strength, and/or the like. For example, solder is typically used to mount the optical fiber so that the solder can be re-melted repeatedly in case a misalignment occurs between the optical fiber and the output of the laser chip. Accordingly, using solder to mount the optical fiber is typically a costly and time-consuming multi-step process, involving several melt-align-cure cycles. Furthermore, the solder joint is typically a single joint made from a fragile material, whereby a quantity of solder used to mount one optical fiber is on the order of tens to hundreds of microliters in order to provide sufficient mechanical support. This can lead to additional challenges, such as a need to have a deep trench separating the chip submount from the fiber submount so that the heat necessary to melt the solder does not cause damage to the laser chip, which can significantly add to the cost of the device, weaken the integrity of the device, and/or the like.

Another approach to mounting the optical fiber is to attach the optical fiber to the fiber mount by an ultraviolet epoxy on a side of the fiber mount. In this case, the fiber mount may be offset from the chip mount, and the side-mounting may be performed using the ultraviolet epoxy in order to elevate the optical fiber to match a height of the output from the laser chip. However, the ultraviolet epoxy on the side of the fiber mount tends to be difficult to apply and control during the manufacturing process. Furthermore, regardless of whether the optical fiber is top-mounted using solder or side-mounted using epoxy, these mounting techniques require multiple mounting structures (e.g., a chip mount, a fiber mount, an additional substrate to hold the chip mount and the fiber, and/or the like), which can add to height, manufacturing costs, complexity, and/or the like. Furthermore, while other approaches may omit the chip mount and use glass solder to directly mount the optical fiber on a fiber mount, these approaches still require multiple mounting structures and the use of solder normally needs to be repeated several times in order to achieve desired power coupling results, which increases manufacturing time, increases manufacturing costs, reduces reliability of the optical fiber (e.g., because the solder weakens the strength of the optical fiber), and/or the like.

Some implementations described herein relate to an optical assembly including a single monolithic platform to mount a laser chip (e.g., a semiconductor laser diode) and an optical fiber in a manner that may ensure that a fiber-to-laser optical coupling has a high efficiency while also providing mechanical support to secure the optical fiber in a position where the fiber-to-laser optical coupling has the high efficiency. In particular, as described in further detail herein, the optical assembly may include a laser chip directly mounted on the monolithic platform and a partially stripped optical fiber mounted to the monolithic platform by at least two separate adhesive joints to provide a simple top-mounting technique. For example, in some implementations, the first adhesive joint may be located close to an output facet from the laser chip and close to a top of the optical fiber. The first adhesive joint may generally contain a quantity of adhesive material (e.g., epoxy) to attach the optical fiber to the monolithic platform at a position (e.g., an elevated height) at which the tip of the optical fiber is aligned with the output facet of the laser chip. In general, the first adhesive joint may contain a threshold quantity of adhesive material (e.g., a minimum amount to establish an optical alignment between the tip of the optical fiber and the output facet of the laser chip), to reduce shrinkage and/or expansion effects that may occur during curing of the adhesive material, which improves the optical alignment between the tip of the optical fiber and the output facet of the laser chip after curing. Accordingly, because the first adhesive joint improves optical coupling but may not provide sufficient mechanical support for the optical fiber, a second adhesive joint may be provided further away from the laser chip with a greater quantity of adhesive material to provide mechanical support for the optical fiber.

In this way, the optical assembly described herein integrates the laser chip and the optical fiber onto a single monolithic platform to achieve a desired laser coupling, which improves reliability and repeatability of optical alignment after curing, provides mechanical support for the optical fiber, reduces a quantity of components used in the optical assembly, and/or the like. Furthermore, relative to conventional designs that use separate sub-mounts for the laser chip and/or the optical fiber, a single adhesive joint, and/or the like, the optical assembly described herein integrates the single monolithic platform with the laser chip, optical fiber, and adhesive joints, which provides the optical assembly with a smaller height (e.g., by removing the height of one or more sub-mounts), fewer components (e.g., by eliminating a need for independent sub-mounts), a simpler and more reliable optical alignment (e.g., by providing separate adhesive joints for optical coupling and mechanical strength), and/or the like.

FIGS. 1A-1D are diagrams of one or more example implementations of an optical assembly 100 that includes a monolithic platform structure 110 with a top-mounted optical fiber 132 having a mechanically secure optical coupling to a semiconductor laser chip 122. For example, as shown in FIGS. 1A-1D, the monolithic platform structure 110 may include a first trench 112-1 and a second trench 112-2 that segment the monolithic platform structure 110 into a chip mount area 120, a first island 130-1, and a second island 130-2. In some implementations, the laser chip 122 may be any suitable edge emitting optical chip with one or more output facets 124 to be aligned with a tip of the optical fiber 132.

In some implementations, the optical fiber 132 may be a fiber that is suitable for telecommunication applications, pump coupling, and/or the like. For example, in some implementations, the optical fiber 132 may be a single mode fiber, a few mode fiber, a multi-mode fiber, a non-circular core fiber, and/or the like. In general, the optical fiber 132 may be partially stripped to remove an outside polymer coating and expose the tip of the optical fiber 132, which may include a core and a transparent cladding that surrounds the core. In some implementations, a length of the optical fiber 132 where the outside polymer coating has been stripped off may have an outside diameter in a range from about 80 micrometers to about 125 micrometers. In some implementations, the length of the optical fiber 132 where the outside polymer coating is stripped may include areas to be mounted to the first island 130-1 and the second island 130-2, and a total length of the optical fiber 132 where the outside polymer coating is stripped may be based on dimensions of an outside package (e.g., housing) of the optical assembly 100 where a snout is presented to receive the partially stripped optical fiber 132.

Figure 1A:
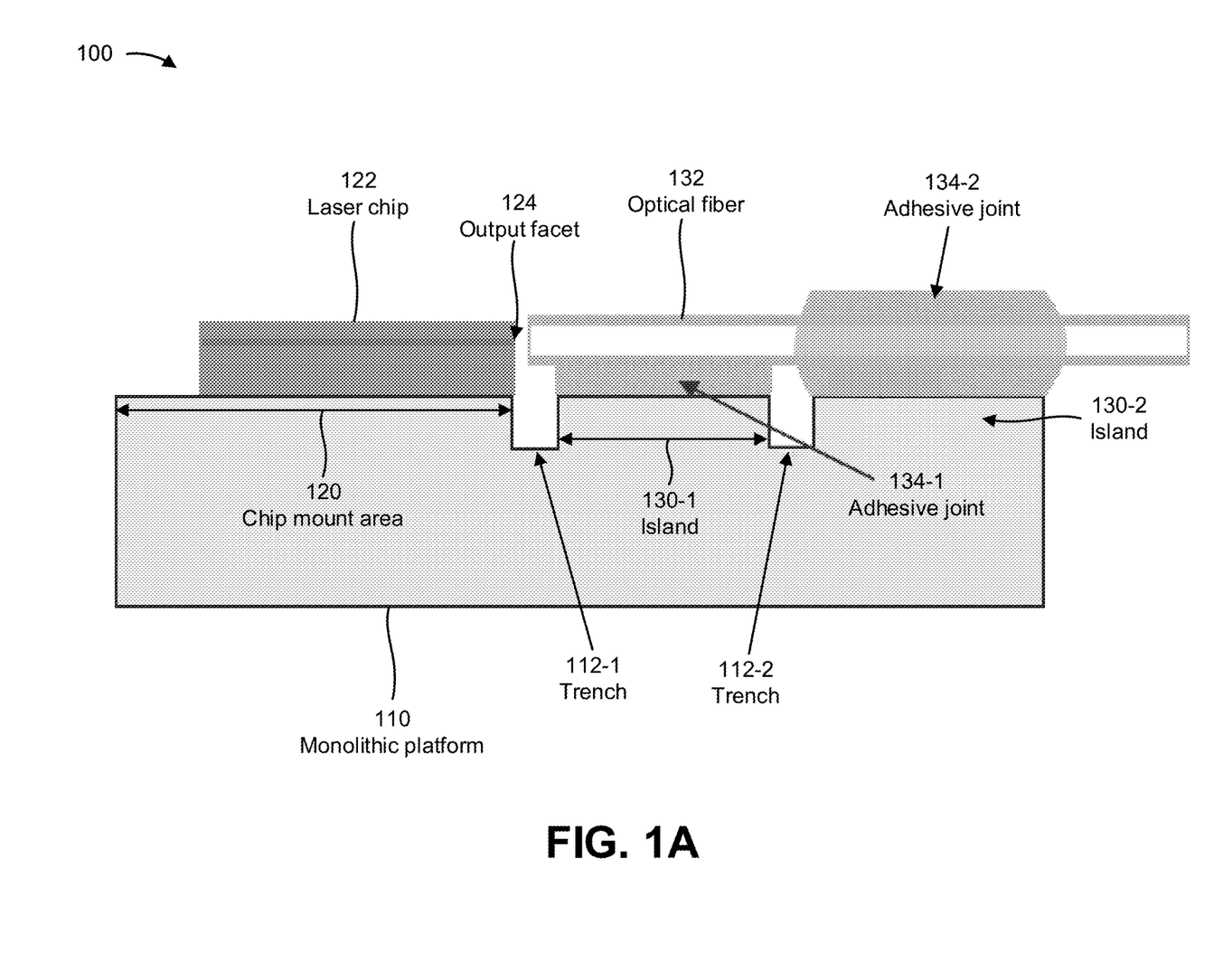
FIGS. 1A-1D are diagrams of one or more example implementations of an optical assembly that includes a monolithic platform structure with a top-mounted optical fiber having a mechanically secure optical coupling to a semiconductor laser chip.
Figure 1B:
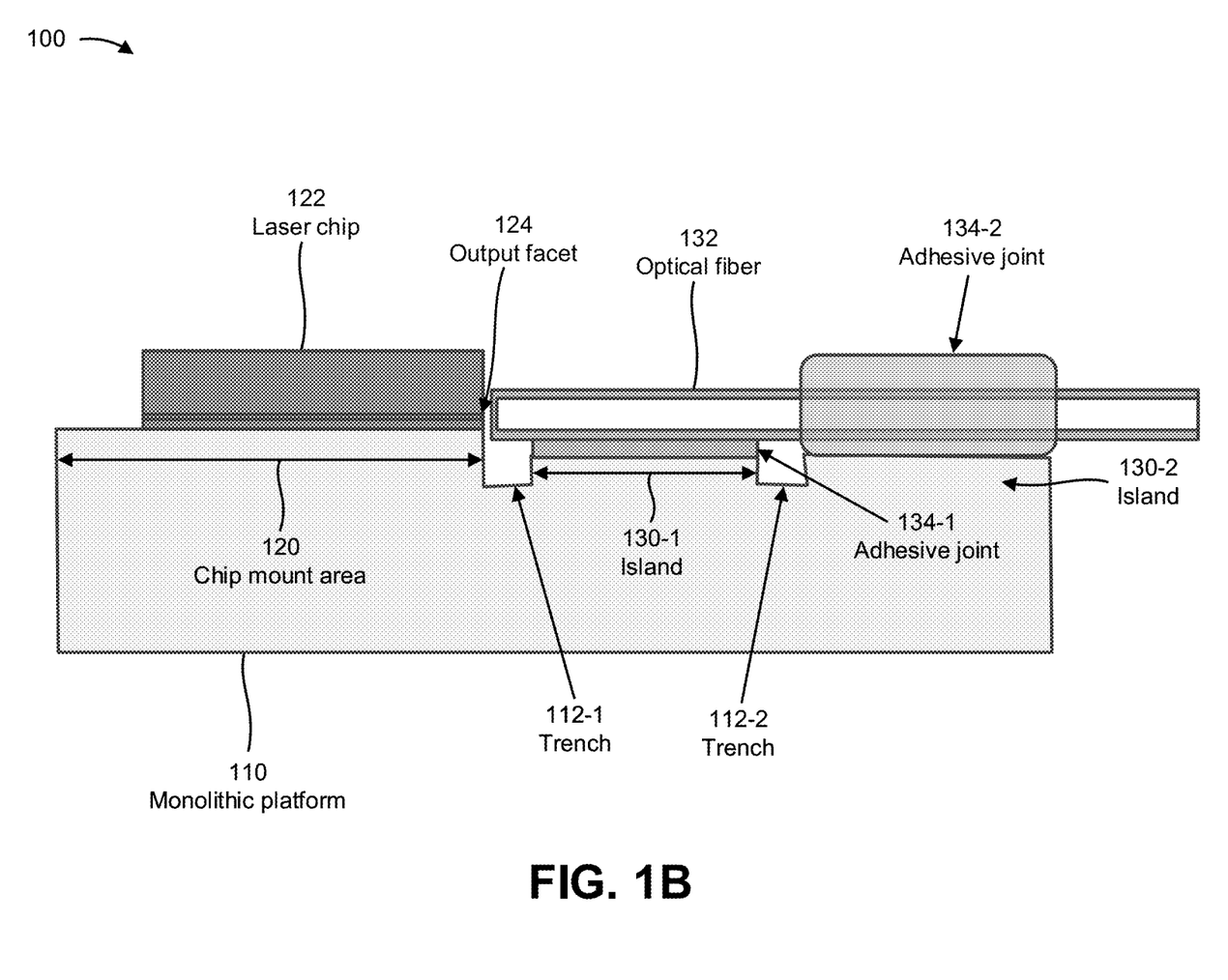

In some implementations, as shown in FIGS. 1A-1D, the monolithic platform structure 110 may include one or more extended surfaces that extend in front of the one or more output facets 124 of the laser chip 122 to enable optical alignment with the tip of the optical fiber 132. In some implementations, as shown in FIG. 1A, the laser chip 122 may have a p-side up configuration, where a negative electrode is connected to the substrate the output facet 124 is located away from a top surface of the chip mount area 120. In such cases, as shown in FIG. 1A, top surfaces of the chip mount area 120, the first island 130-1, and the second island 130-2 may be substantially level. Alternatively, as shown in FIG. 1B, the laser chip 122 may have a p-side down configuration, where a positive electrode is connected to the substrate and the output facet 124 is located closer to the top surface of the chip mount area 120. In such cases, because the output facet 124 is located about 5 microns from the chip mount surface 120 and the optical fiber 132 has a radius of about 60 microns, the top surfaces of the first island 130-1 and the second island 130-2 may be stepped down to accommodates the thickness of the optical fiber 132 and thereby enable alignment of the output facet 124 and the tip of the optical fiber 132. Furthermore, in cases where the laser chip 122 has a p-side down configuration (e.g., as shown in FIG. 1B), a stepped down portion of the first island 130-1 and/or the second island 130-2 may be localized to an area where the optical fiber 132 is to be attached to the monolithic platform 110. For example, narrow grooves or slots to receive the optical fiber 132 and the adhesive material used to form the adhesive joints 134-1, 134-2 may be etched or otherwise formed in areas of the monolithic platform 110 that correspond the first island 130-1 and/or the second island 130-2. Alternatively, in some implementations, the stepped down portion of the first island 130-1 and/or the second island 130-2 may extend across an entire width of the monolithic platform 110.

Accordingly, in some implementations, the top surface of the chip mount area 120 and top surfaces of the first island 130-1 and the second island 130-2 may generally be arranged relative to one another based on the configuration or positioning of the laser chip 122 (e.g., with the top surfaces substantially level in a p-side up configuration, as shown in FIG. 1A, or with at least a portion of the top surfaces of the first island 130-1 and the second island 130-2 stepped down relative to the top surface of the chip mount area 120 in a p-side down configuration, as shown in FIG. 1B). This may simplify processes to optically align the one or more output facets 124 of the laser chip 122 and the tip of the optical fiber 132 and improve quality (e.g., efficiency) of the optical alignment between the one or more output facets 124 of the laser chip 122 and the tip of the optical fiber 132, which may be securely held in place at an elevated height above the top surface of the first island 130-1 and the second island 130-2 (e.g., a height at which the one or more output facets 124 of the laser chip 122 are aligned with the tip of the optical fiber 132) by a first adhesive joint 134-1 and a second adhesive joint 134-2.

As further shown in FIGS. 1A-1D, the laser chip 122 may be mounted directly on the chip mount area 120 using any suitable mounting technique (e.g., a chip-on-submount (CoS) technique). For example, in some implementations, the monolithic platform structure 110 may include a printed circuit board or another suitable mechanical structure that includes one or more electrical circuits, and the laser chip 122 may include a heatsink that is soldered or otherwise attached to a surface of the monolithic platform structure 110, a thin or thick film metallization layer (e.g., nickel, gold, or another material on a ceramic substrate, such as an aluminum nitride (AlN) layer) that is attached to the heatsink by a thermally conductive epoxy to provide heat flow between interfaces, and a laser diode that is electrically connected to the monolithic platform structure 110 by one or more wire bond pads or other suitable interconnects that provide contact between the one or more electrical circuits on the monolithic platform structure 110 and a cathode and anode of the laser diode. Furthermore, as shown in FIGS. 1A-1D, the optical fiber 132 may be mounted on the first island 130-1 by a first adhesive joint 134-1 and on the second island 130-2 by a second adhesive joint 134-2.

In some implementations, the first adhesive joint 134-1 may include a first quantity of adhesive material (e.g., epoxy) attaching the optical fiber 132 to the first island 130-1 at a position (e.g., an elevated height) at which the tip of the optical fiber 132 is aligned with the output facet 124 of the laser chip 122. Furthermore, in some implementations, the second adhesive joint 134-2 may include a second quantity of the adhesive material to mechanically secure the optical fiber 132 to the second island 130-2. For example, the first adhesive joint 134-1 may contain a threshold quantity of the adhesive material (e.g., a minimum amount to establish a stable optical alignment between the tip of the optical fiber 132 and the output facet 124 of the laser chip 122, such as a few microliters or less). In this way, using only the threshold quantity of the adhesive material to form the first adhesive joint 134-1 reduces shrinkage and/or expansion effects that may occur when the first adhesive joint 134-1 is cured (e.g., by exposure to ultraviolet light, thermal curing, and/or the like in a curing process that includes several on-off cycles, a one-time long exposure curing, and/or the like). Furthermore, by only using the threshold quantity of the adhesive material to form the first adhesive joint 134-1, reliability of the optical alignment is improved after the first adhesive joint 134-1 is cured. For example, as described above, the adhesive material may be an epoxy that tends to shrink or expand when the epoxy is cured, to improve mechanical, chemical, and/or heat resistance properties of the epoxy. Consequently, the first adhesive joint 134-1 may contain the threshold quantity of epoxy to prevent the optical fiber 132 from being displaced and thus becoming misaligned with the output facet 124 of the laser chip 122 when the epoxy shrinks or expands during curing. However, because the first adhesive joint 134-1 only contains the threshold quantity of the adhesive material needed to maintain the alignment between the tip of the optical fiber 132 and the output facet 124 of the laser chip 122, the first adhesive joint 134-1 may not provide sufficient mechanical support for the optical fiber 132.

Accordingly, relative to the first adhesive joint 134-1, the second adhesive joint 134-2 that is located further away from the laser chip 122 may contain a greater quantity of the adhesive material (e.g., tens of microliters) to hold the optical fiber 132 firmly and provide mechanical strength to secure the optical fiber 132 (e.g., permanently attaching the optical fiber 132 to the monolithic platform structure 110 in a position where the tip of the optical fiber 132 and the output facet 124 of the laser chip 122 are aligned). In this way, the first adhesive joint 134-1 (and thus the first island 130-1) may be provided to establish an optical coupling between the laser chip 122 and the optical fiber 132, and the second adhesive joint 134-2 (and thus the second island 130-2) may be provided to mechanically secure or otherwise fix the optical fiber 132 in place. Furthermore, because the first adhesive joint 134-1 fixes the optical alignment between the tip of the optical fiber 132 and the output facet 124 of the laser chip 122, shrinkage and/or expansion effects that may occur when the second adhesive joint 134-2 is cured may not affect the optical alignment established by the first adhesive joint 134-2. In this way, the laser chip 122 and the optical fiber 132 may be integrated with the monolithic platform structure 110 to achieve a desired laser coupling, and using only the threshold quantity of adhesive material in the first adhesive joint 134-1 improves reliability and repeatability of the optical alignment after curing.

In some implementations, to further improve the reliability and repeatability of the optical alignment between the tip of the optical fiber 132 and the output facet(s) 124 of the laser chip 122, the monolithic platform structure 110 may be patterned with one or more trenches 112. For example, as described herein, the trenches 112 may be formed in the monolithic platform structure 110 to control a flow of the adhesive material used in the first adhesive joint 134-1 and the second adhesive joint 134-1 when the adhesive material is deposited or otherwise applied over the fiber. For example, in the example optical assembly 100 shown in FIGS. 1A-1D, a first trench 112-1 may be provided between the chip mount area 120 where the laser chip 122 is mounted to form the first island 130-1 to which the optical fiber 132 is attached by the first adhesive joint 134-1. Accordingly, the first trench 112-1 may have one or more dimensions to reduce a risk that the quantity of adhesive material used to form the first adhesive joint 134-1 will overflow onto the laser chip 122 and/or the tip of the optical fiber 132. For example, any excess adhesive material that may be applied when forming the first adhesive joint 134-1 may flow into the first trench 112-1, which avoids a potential risk that adhesive material could overflow onto the laser chip 122 and/or the tip of the optical fiber 132 and thereby damage optical components, affect the optical coupling between the laser chip 122 and the optical fiber 132, and/or the like. Alternatively, in some implementations, the first trench 112-1 may not need to be formed in the monolithic platform structure 110 when suitable techniques enable tight control over the quantity of adhesive material used to form the first adhesive joint 134-1 such that the risk of uncontrolled overflow is sufficiently reduced. Furthermore, in some implementations, a second trench 112-2 may be provided between the first adhesive joint 134-1 and the second adhesive joint 134-2 to reduce a risk that adhesive material used to form the second adhesive joint 134-2 will affect the optical alignment between the tip of the optical fiber 132 and the output facet 124 of the laser chip 122 by overflowing onto the first adhesive joint 134-1.

In some implementations, in order to confine or otherwise capture overflow adhesive material, the trenches 112 may be approximately 0.2 mm wide and about 0.35 mm deep (e.g., based on the islands 130 having a width of approximately 1 mm), although the dimensions of the trenches 112 may be suitably reduced and/or increased depending on an expected amount of adhesive material overflow, a degree to which curing causes the adhesive material to shrink, expand, and/or the like. Furthermore, in some implementations, the islands 130 may have different sizes depending on package space. In general, however, the islands 130 are sufficiently wide to enable formation of the adhesive joints 134 to hold the optical fiber 132 in place. In some implementations, the dimensions provided above for the trenches 112 and the islands 130 may generally depend on dimensions of the monolithic platform structure 110, which may have a suitable form factor to hold the laser chip 122 and sufficient additional space to attach the optical fiber 132 (e.g., 8.5 mm×6 mm, 6 mm×4 mm, 4 mm×3 mm, and/or the like).

In some implementations, the trenches 112 shown in FIGS. 1A-1D extend laterally across the monolithic platform structure 110. Additionally, or alternatively, the trenches 112 may be formed with other suitable shapes to limit overflow of the adhesive material. For example, in some implementations, the trenches 112 may be limited or localized to regions around the adhesive joints 134 and/or other suitable areas where there may be a risk that the adhesive material will overflow (e.g., the trenches 112 may be implemented as holes in the monolithic platform structure 110). However, forming the trenches 112 to extend across the monolithic platform structure 110 may be simpler from a manufacturing perspective, and having the trenches 112 extend laterally and vertically may reduce thermal transfer from the laser chip 122 to the islands 130 to which the optical fiber 132 is mounted. Furthermore, the dimensions of the trenches 112 may be constrained to avoid weakening the structural integrity of the monolithic platform structure 110. For example, deepening, widening, or otherwise increasing the dimensions of the trenches 112 may increase a risk that the monolithic platform structure 110 will crack or break under mechanical stress, high or low temperatures, and/or the like.

In some implementations, during an assembly process, the laser chip 122 may be attached to the monolithic platform structure 110, which may have the one or more trenches 112 formed therein. In particular, the tip of the optical fiber 132 generally needs to be located physically close to the output facet 124 of the laser chip 122 due to beam expansion in free space. Furthermore, the tip of the optical fiber 132 needs to be close to an edge of the first adhesive joint 134-1 in order to establish a suitable optical alignment with the output facet 124 of the laser chip 122. Accordingly, due to the need for close physical proximity between the tip of the optical fiber 132, the output facet 124 of the laser chip 122, and the edge of the first adhesive joint 134-1, the first trench 112-1 is provided to prevent the adhesive material used to form the adhesive joint 134-1 from overflowing onto or otherwise interfering with the output facet 124 of the laser chip 122 and/or the tip of the optical fiber 132. Furthermore, in some implementations, the second trench 112-1 may be provided between the first adhesive joint 134-1 and the second adhesive joint 134-2 to prevent the adhesive material used to form the second adhesive joint 134-2 from overflowing onto the first adhesive joint 134-1 and potentially affecting optical alignment of the optical fiber 132. Alternatively, in some cases, the first adhesive joint 134-1 and the second adhesive joint 134-2 may be physically separated by a sufficient distance to prevent the adhesive material used to form the second adhesive joint 134-2 from overflowing onto the first adhesive joint 134-1, in which case the second trench 112-2 may be omitted.

In some implementations, after the laser chip 122 is attached to the monolithic platform structure 110, a first quantity of adhesive material may be applied to a bare and/or stripped portion of the optical fiber 132 positioned over the first island 130-1 in order to form the first adhesive joint 134-1. As described above, the first quantity of adhesive material may contain a threshold amount of uniformly distributed epoxy needed to maintain suitable alignment between the tip of the optical fiber 132 and the output facet 124 of the laser chip 122 (e.g., an amount of epoxy to elevate the tip of the optical fiber 132 to a height that matches the output facet 124 of the laser chip 122 and minimize misalignment or mechanical deviation of the optical fiber 132 during or after curing of the epoxy, as a small quantity of epoxy may generally exhibit a small amount of shrinkage or expansion). Furthermore, as described above, the first adhesive joint 134-1 provides only a small amount of mechanical support for the optical fiber 132.

Accordingly, in some implementations, a second quantity of adhesive material may be applied to the bare and/or stripped portion of the optical fiber 132 positioned over the second island 130-2 in order to form the second adhesive joint 134-2 (e.g., after the first quantity of adhesive material is applied and cured or partially cured, simultaneously with application and curing of the first quantity of adhesive material, and/or the like). In some implementations, as described above, the second quantity of adhesive material may be greater than the first quantity of adhesive material, whereby the second adhesive joint 134-2 may function to hold the optical fiber 132 in place (e.g., to provide mechanical support without affecting the optical alignment established by the first adhesive joint 134-1) with sufficient mechanical strength to endure mechanical forces that may be exerted on the optical fiber 132 (e.g., due to operation of the laser chip 122, environmentally induced forces, and/or the like).

Figure 1C:
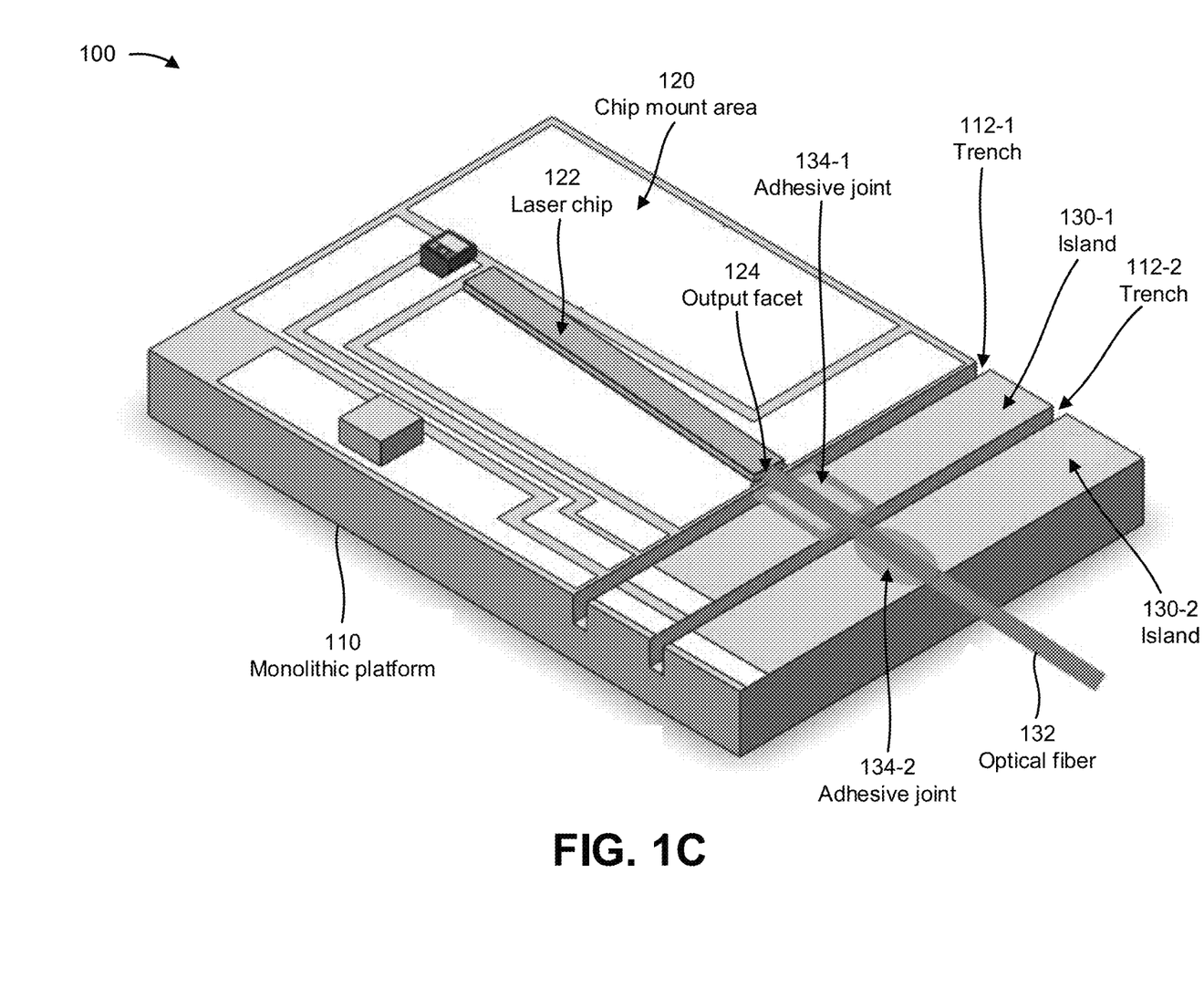
Figure 1D:
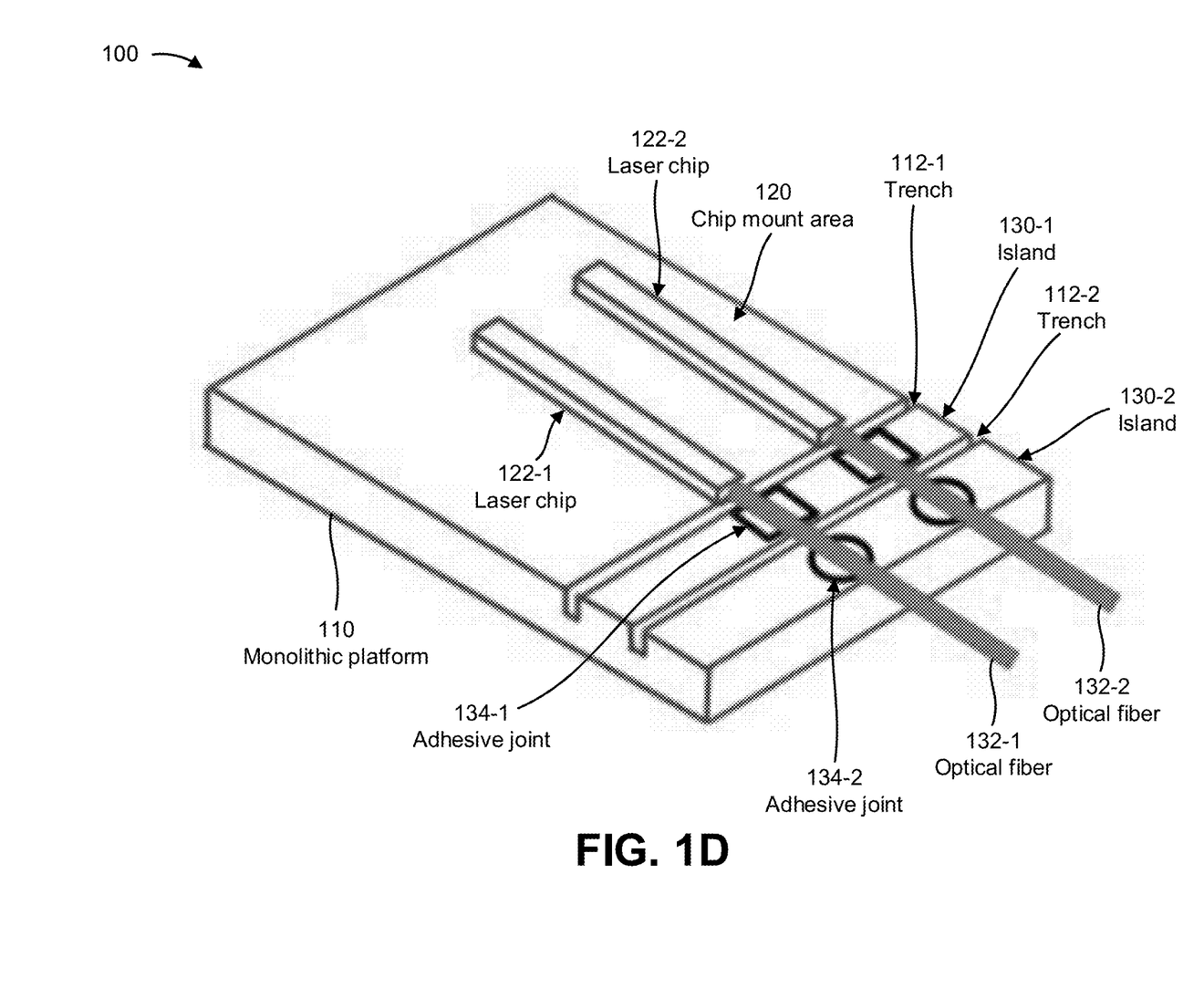

In some implementations, the monolithic platform structure 110 may be used to mount multiple laser chips 122, one or more laser chips 122 that have multiple emitters and/or multiple output facets 124, multiple optical fibers 132, and/or the like. For example, whereas FIGS. 1A-1C illustrate the optical assembly 100 as including a single fiber 132 and a single laser chip 122, FIG. 1D illustrates an example arrangement in which the monolithic platform structure 110 includes two laser chips 122-1, 122-2, with two optical fibers 132-1, 132-2 coupled to the respective laser chips 122-1, 122-2 on the same side. In this case, the optical fibers 132-1, 132-2 share (e.g., are both mounted to) islands 130-1, 130-2. Additionally, or alternatively, in some cases, the optical fibers 132-1, 132-2 may be coupled to the respective laser chips 122-1, 122-2 on opposite sides. For example, the monolithic platform structure 110 may include a first set of one or more laser chips 122 that have output facets 124 on one end and a second set of one or more laser chips 122 that have output facets 124 on an opposite end. For example, a first optical fiber 132-1 may be coupled to one end of a first laser chip 122-1 in the manner shown in FIG. 1D, and a second optical fiber 132-2 may be coupled to an opposite end of a second laser chip 122-2 (e.g., an arrangement of the second laser chip 122-2 and the second optical fiber 132-2 may be reversed relative to the arrangement shown in FIG. 1D).

In some implementations, in cases where multiple laser chips 122 are mounted to the monolithic platform structure 110, the monolithic platform structure 110 may be extended on either end or both ends of the laser chip(s) 122 to provide sufficient space to accommodate the optical fibers 132 that may be coupled to the multiple laser chips 122 on the same or opposite sides. Furthermore, in cases where optical fibers 132 are coupled to the laser chips 122 on opposite sides, additional trenches 112 may be formed in the monolithic platform structure 110 to confine adhesive material used to form additional adhesive joints 134, prevent thermal transfer, and/or the like for the optical fibers 132 coupled to the output facets 124 on either end of the laser chip(s) 122. For example, in this case, an additional set of islands (not shown) may be formed to enable mounting one or more optical fibers 132 on the opposite side of the monolithic platform structure 110. Furthermore, in cases where multiple laser chips 122 and/or optical fibers 132 are aligned across the chip mount area 120 and the one or more islands 130 (e.g., in a parallel arrangement, such as that shown in FIG. 1D), trenches 112 may be provided between the optical fibers 132 (e.g., perpendicular to the trenches 112 shown in FIGS. 1A-1D) to capture or otherwise confine adhesive material that may overflow when forming the adhesive joints 134 for adjacent optical fibers 132-1, 132-2.

As indicated above, FIGS. 1A-1D are provided merely as one or more examples. Other examples may differ from what is described with regard to FIGS. 1A-1D. For example, although FIGS. 1A-1D illustrate the first adhesive joint 134-1 as being formed below the optical fiber 132 and the second adhesive joint 134-2 as being formed around the sides and on top of the optical fiber 132, such illustration is merely intended to visually depict that the quantity of adhesive material used to form the first adhesive joint 134-1 is smaller than the quantity of adhesive material used to form the second adhesive joint 134-1. Accordingly, in some implementations, the first adhesive joint 134-1 may also be formed around the sides of the optical fiber 132 and/or on top of the optical fiber 132. Similarly, although FIGS. 1A-1D illustrate the first adhesive joint 134-1 and the second adhesive joint 134-2 as having approximately equal widths, in some implementations, the first adhesive joint 134-1 and the second adhesive joint 134-2 may have different widths.

Figure 2:
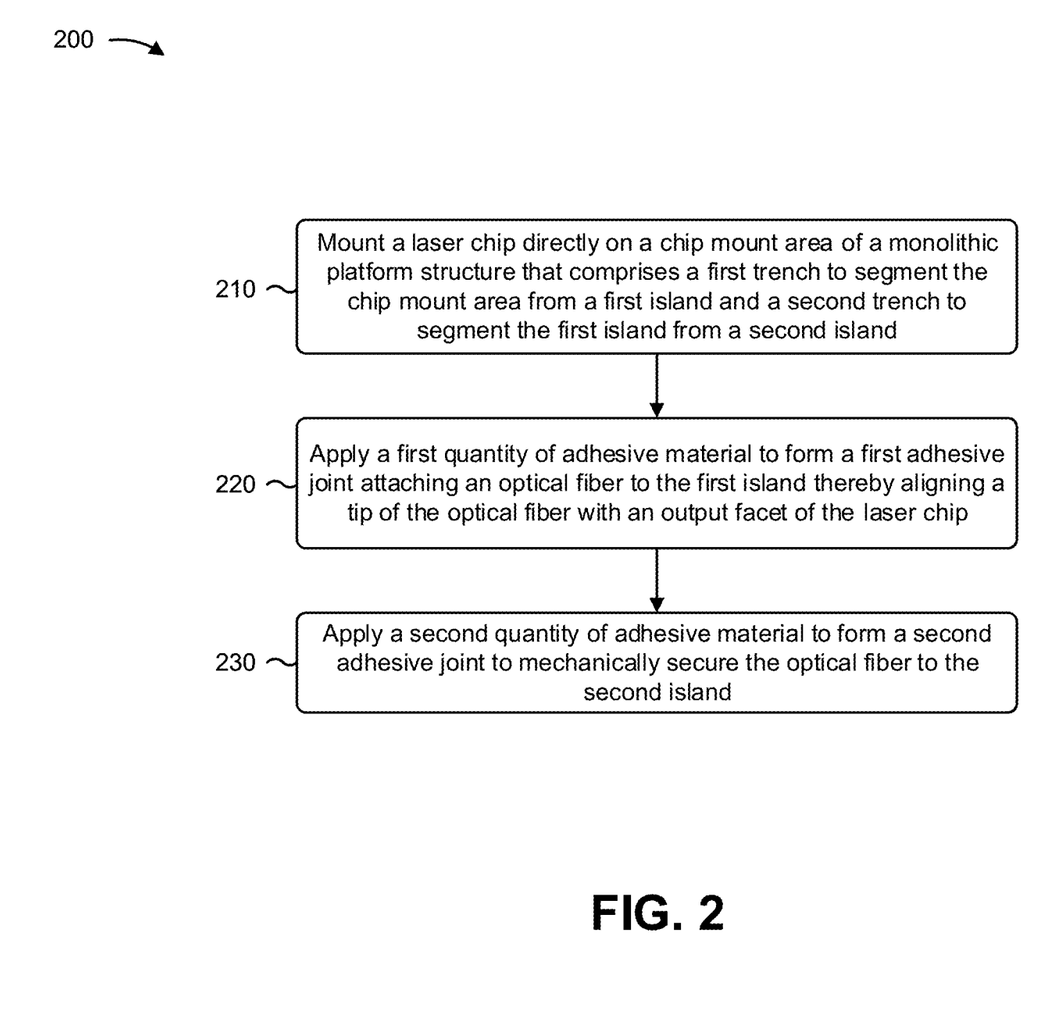
FIG. 2 is a flowchart of an example process for assembling an optical assembly that includes a monolithic platform structure with a top-mounted optical fiber having a mechanically secure optical coupling to a semiconductor laser chip.

FIG. 2 is a flowchart of an example process 200 for assembling an optical assembly that includes a monolithic platform structure with a top-mounted optical fiber having a mechanically secure optical coupling to a semiconductor laser chip as described herein.

As shown in FIG. 2, process 200 may include mounting a laser chip directly on a chip mount area of a monolithic platform structure that comprises a first trench to segment the chip mount area from a first island and a second trench to segment the first island from a second island (block 210). For example, as described above, laser chip 122 may be mounted directly on a chip mount area 120 of a monolithic platform structure 110 that comprises a first trench 112-1 to segment the chip mount area 120 from a first island 130-1, and a second trench 112-2 to segment the first island 130-1 from a second island 130-2.

As further shown in FIG. 2, process 200 may include applying a first quantity of adhesive material to form a first adhesive joint attaching an optical fiber to the first island thereby aligning a tip of the optical fiber with an output facet of the laser chip (block 220). For example, as described above, a first quantity of adhesive material may be applied to form a first adhesive joint 134-1 attaching an optical fiber 132 to the first island 130-1, thereby aligning a tip of the optical fiber 132 with an output facet 124 of the laser chip 122.

As further shown in FIG. 2, process 200 may include applying a second quantity of adhesive material to form a second adhesive joint to mechanically secure the optical fiber to the second island (block 230). For example, as described above, a second quantity of adhesive material may be applied to form a second adhesive joint 134-2 to mechanically secure the optical fiber 132 to the second island 130-2.

Process 200 may include additional implementations, such as any single implementation or any combination of implementations described below and/or in connection with one or more other processes described elsewhere herein.

In a first implementation, the first trench 112-1 is disposed between the chip mount area 120 and the first island 130-1 to prevent the first quantity of the adhesive material from overflowing onto one or more of the tip of the optical fiber 132 or the output facet 124 of the laser chip 122.

In a second implementation, alone or in combination with the first implementation, the second trench 112-2 is disposed between the first island 130-1 and the second island 130-2 to prevent the second quantity of the adhesive material from overflowing onto the first adhesive joint 134-1.

In a third implementation, alone or in combination with one or more of the first and second implementations, process 200 may further include curing the first quantity of the adhesive material to form the first adhesive joint 134-1, and the first quantity of the adhesive material applied to form the first adhesive joint 134-1 is based on a degree to which the curing causes the adhesive material to shrink or expand.

In a fourth implementation, alone or in combination with one or more of the first through third implementations, the first quantity of the adhesive material applied to form the first adhesive joint 134-1 is sufficient to establish an optical coupling between the tip of the optical fiber 132 and the output facet 124 of the laser chip 122 and insufficient to mechanically support the optical fiber 132, and the second quantity of the adhesive material applied to form the second adhesive joint 134-2 is larger than the first quantity of the adhesive material and sufficient to mechanically support the optical fiber 132 without affecting the optical coupling between the tip of the optical fiber 132 and the output facet 124 of the laser chip 122.

In a fifth implementation, alone or in combination with one or more of the first through fourth implementations, the first trench 112-1 and the second trench 112-2 extend laterally across the monolithic platform structure 110.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus, comprising:
    a monolithic platform structure comprising a first trench and a second trench segmenting the monolithic platform structure into a chip mount area, a first island, and a second island,
        wherein the monolithic platform structure comprises one or more electrical circuits;
    a laser chip mounted directly on the chip mount area such that a cathode and anode of the laser chip are in contact with at least one of the one or more electrical circuits; and
    an optical fiber mounted on the first island by a first adhesive joint and on the second island by a second adhesive joint,
        wherein the first adhesive joint includes a first quantity of adhesive material attaching the optical fiber to the first island at a position at which a tip of the optical fiber is aligned with an output facet of the laser chip, and
        wherein the second adhesive joint includes a second quantity of the adhesive material to mechanically secure the optical fiber to the second island.

2. The apparatus of claim 1, wherein the first trench is formed between the chip mount area and the first island to prevent the first quantity of the adhesive material from overflowing onto one or more of the tip of the optical fiber or the output facet of the laser chip.

3. The apparatus of claim 1, wherein the second trench is formed between the first island and the second island to prevent the second quantity of the adhesive material from overflowing onto the first adhesive joint.

4. The apparatus of claim 1, wherein the first quantity of the adhesive material used in the first adhesive joint is based on a degree to which curing causes the adhesive material to shrink or expand.

5. The apparatus of claim 1, wherein:
    the first quantity of the adhesive material used in the first adhesive joint is sufficient to establish an optical coupling between the tip of the optical fiber and the output facet of the laser chip and insufficient to mechanically support the optical fiber, and
    the second quantity of the adhesive material used in the second adhesive joint is larger than the first quantity of the adhesive material to mechanically support the optical fiber without affecting the optical coupling between the tip of the optical fiber and the output facet of the laser chip.

6. The apparatus of claim 1, wherein the first island and the second island have respective surfaces that are substantially level or stepped down with respect to a surface of the chip mount area based on a position of the output facet of the laser chip.

7. The apparatus of claim 1, wherein one or more of the first trench or the second trench are configured to reduce thermal transfer from the laser chip to the first island or the second island.

8. The apparatus of claim 1, wherein the first trench and the second trench extend laterally across the monolithic platform structure.

9. The apparatus of claim 1, wherein the adhesive material comprises an epoxy.

10. The apparatus of claim 1, wherein the laser chip is an edge emitting optical chip.

11. A method, comprising:
mounting a laser chip directly on a chip mount area of a monolithic platform structure that comprises a first trench to segment the chip mount area from a first island and a second trench to segment the first island from a second island,
wherein the monolithic platform structure comprises one or more electrical circuits, and
wherein a cathode and an anode of the laser chip are in contact with at least one of the one or more electrical circuits;
applying a first quantity of adhesive material to form a first adhesive joint attaching an optical fiber to the first island thereby aligning a tip of the optical fiber with an output facet of the laser chip; and
applying a second quantity of adhesive material to form a second adhesive joint to mechanically secure the optical fiber to the second island.

12. The method of claim 11, wherein the first trench is disposed between the chip mount area and the first island to prevent the first quantity of the adhesive material from overflowing onto one or more of the tip of the optical fiber or the output facet of the laser chip.

13. The method of claim 11, wherein the second trench is disposed between the first island and the second island to prevent the second quantity of the adhesive material from overflowing onto the first adhesive joint.

14. The method of claim 11, further comprising curing the first quantity of the adhesive material to form the first adhesive joint,
wherein the first quantity of the adhesive material applied to form the first adhesive joint is based on a degree to which the curing causes the adhesive material to shrink or expand.

15. The method of claim 11, wherein:
the first quantity of the adhesive material applied to form the first adhesive joint is sufficient to establish an optical coupling between the tip of the optical fiber and the output facet of the laser chip and insufficient to mechanically support the optical fiber, and
the second quantity of the adhesive material applied to form the second adhesive joint is larger than the first quantity of the adhesive material to mechanically support the optical fiber without affecting the optical coupling between the tip of the optical fiber and the output facet of the laser chip.

16. The method of claim 11, wherein the first trench and the second trench extend laterally across the monolithic platform structure.

17. An apparatus, comprising:
a monolithic platform structure comprising one or more trenches segmenting the monolithic platform structure into a chip mount area and one or more islands;
multiple laser chips mounted directly on the chip mount area,
wherein each of the multiple laser chips are electrically connected to the monolithic platform structure via corresponding laser diodes of the multiple laser chips, and
wherein each of the multiple laser chips are physically mounted directly on the chip mount area via corresponding heatsink portions of the multiple laser chips; and
multiple optical fibers mounted on the one or more islands by one or more adhesive joints that attach the multiple optical fibers to the one or more islands at respective positions at which tips of the multiple optical fibers are aligned with output facets of the multiple laser chips.

18. The apparatus of claim 17, wherein:
the one or more trenches are a first set of one or more trenches, and
the monolithic platform structure further comprises a second set of one or more trenches to prevent an adhesive material used to form the one or more adhesive joints from overflowing.

19. The apparatus of claim 17, wherein the multiple laser chips include a first laser chip having a first output facet and a second laser chip having a second output facet, and wherein the first output facet and the second output facet are provided on the same end of the first laser chip and the second laser chip.

20. The apparatus of claim 17, wherein the multiple laser chips include a first laser chip having a first output facet and a second laser chip having a second output facet, and wherein the first output facet and the second output facet are provided on opposite ends of the first laser chip and the second laser chip.

* * * * *